Figure 1:
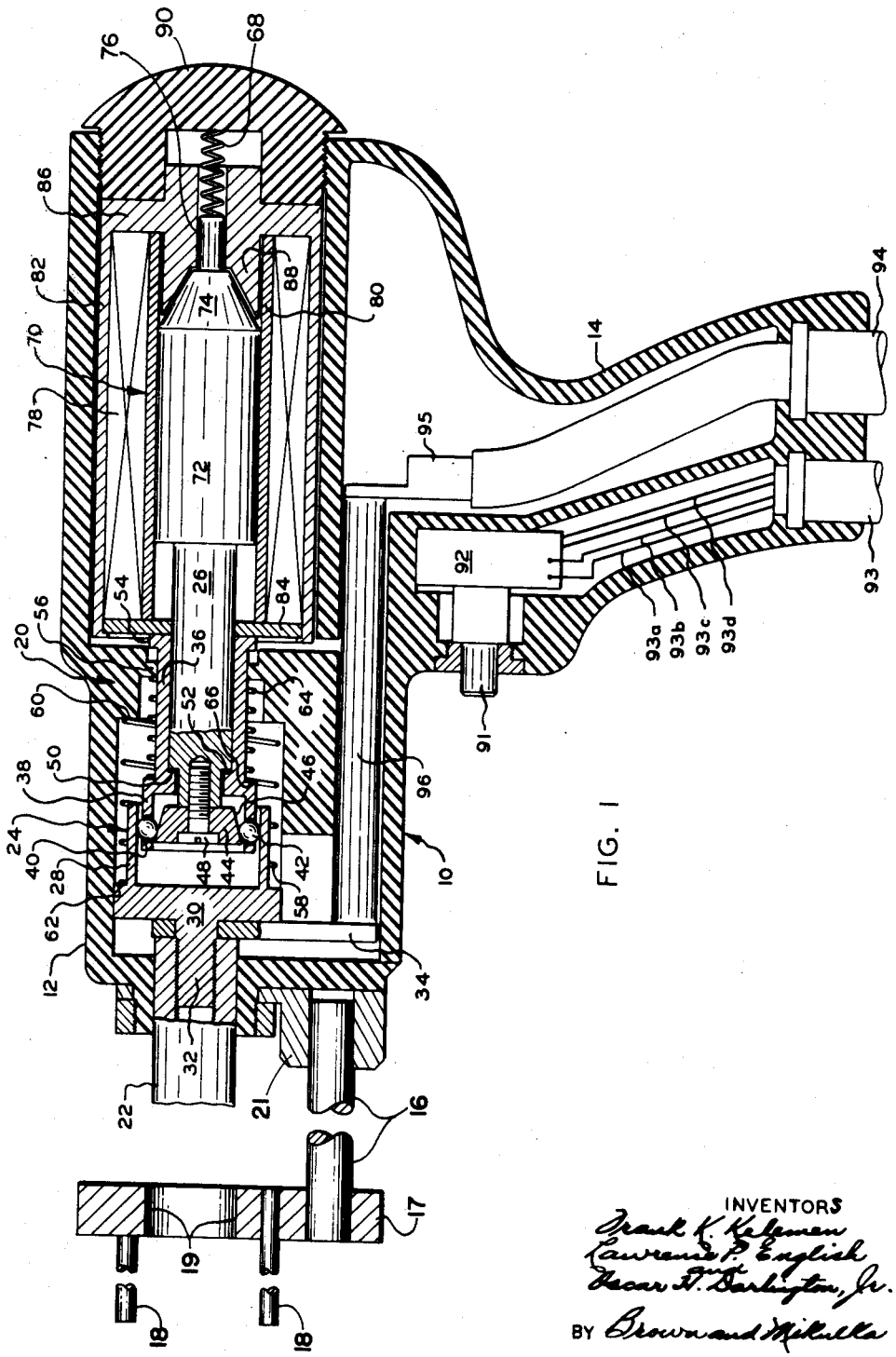

May 24, 1960

F. K. KELEMEN ET AL 2,938,105

STUD WELDING APPARATUS

Filed Jan. 29, 1958

2 Sheets-Sheet 1

INVENTORS
Frank K. Kelemen
Lawrence P. English
Oscar T. Darlington, Jr.
BY Brown and Mikulka
ATTORNEYS

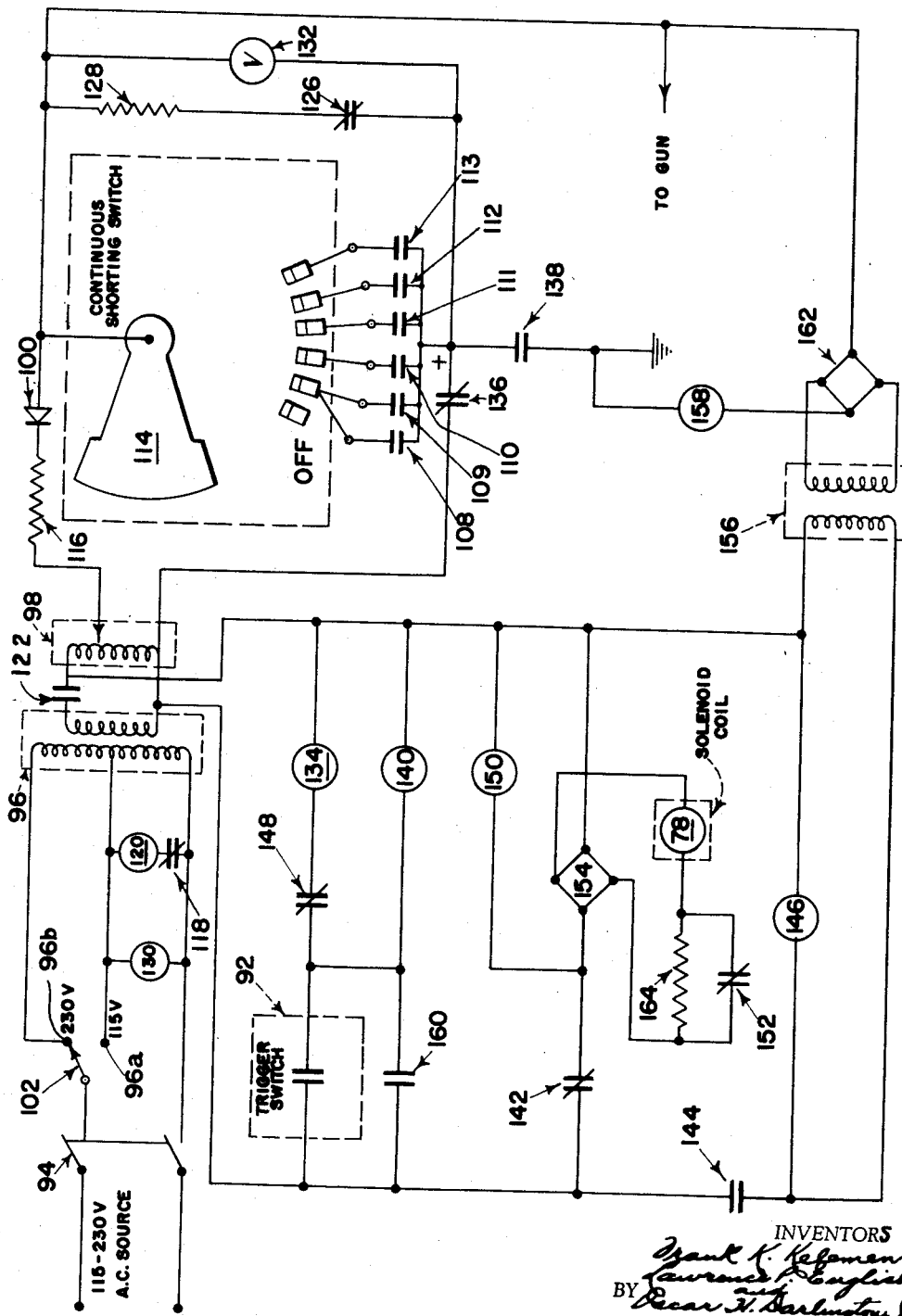

United States Patent Office 2,938,105
Patented May 24, 1960

2,938,105

STUD WELDING APPARATUS

Frank K. Kelemen, Haddonfield, Lawrence P. English, Haddon Heights, and Oscar H. Darlington, Jr., Pennsauken Township, Camden County, N.J., assignors to KSM Products, Inc., Merchantville, N.J., a corporation of New Jersey Filed Jan. 29, 1958, Ser. No. 711,907

23 Claims. (Cl. 219—98)

This invention relates to stud welding apparatus, including a stud welding gun and means for energizing and controlling the operation of the gun.

Stud welding processes employing pistol-type guns fall into two general categories. The first includes conventional processes wherein the stud is initially located in contact with the workpiece, is lifted from the workpiece as welding current is passed through the stud to establish an arc between the stud and workpiece and, after a predetermined interval, the stud is plunged into contact with the workpiece. As a general rule, in so-called automatic guns useful in this process, lift of the stud is effected by a solenoid while the plunger is effected by a spring. In the second category of stud welding, sometimes characterized as "percussion welding," the stud is initially spaced away from the work and is moved into contact with the work at the same time the welding current is applied so that an arc is established during movement of the stud toward the work. Guns designed for percussion welding, as a general rule, have included pneumatic operating devices, or have been operated by springs requiring manual tension and could not be described as being automatic in operation. Heretofore, apparatus, including guns, designed for conventional stud welding could not be employed interchangeably with guns designed for percussion welding.

Objects of the invention are: to provide means for adapting a stud welding gun designed for conventional stud welding to automatic percussion stud welding operation, and to provide, in combination with a stud welding gun of the aforesaid type, novel power supply and control circuits operated from an alternating current source.

Another object of the invention is to provide, in combination with a solenoid-actuated stud welding gun, a capacitance discharge welding power supply and a completely automatic control circuit for holding a stud away from a workpiece and driving said stud toward the workpiece while simultaneously applying direct welding current to said stud.

A further object of the invention is to provide, in stud welding apparatus of the foregoing type, wherein the stud-holding means is moved into and maintained in lift position by a solenoid, electrical control means for supplying a relatively high lift current to the solenoid and thereafter supplying a relatively low current to the solenoid for maintaining the stud-holding means in lift position.

Still another object of the invention is to provide a stud welding apparatus of the foregoing type wherein lift is effected automatically following a welding operation only after the stud-holding means of the gun has been disengaged from the welded stud.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a view, partially in section and partially in elevation, of one form of welding gun adapted to constitute a component of the apparatus of the present invention, the section being taken along the main longitudinal axis of said gun; and Figure 2 is a wiring diagram illustrating schematically one form of electrical circuit embodying the novel welding supply and control system of the present invention.

The novel stud welding supply and control circuit of the invention is intended for use in combination with stud welding apparatus comprising a solenoid-actuated lifting means and designed for conventional stud welding operation wherein welding current is applied to the stud during lift to establish a welding arc, following which the stud is moved into contact with the workpiece by a spring. Although the circuit of the invention is illustrated and described in combination with a stud welding gun of the semi-automatic pistol type described more fully in Patent No. 2,796,513, issued to Frank K Kelemen et al. on June 18, 1957, it will be apparent that it may be embodied in units comprising other forms of guns, such as the automatic and stationary types, having solenoid-actuated lift means thereby making these units capable of automatic percussion stud welding. The preferred form of the percussion welding apparatus of the invention is powered by a single alternating current source, welding current being supplied from a capacitor. The timing and control over the operation of the gun is fully automatic from the time the operator positions the gun with respect to the workpiece and closes the trigger switch until the stud-holding means of the gun has returned to lift position following the welding operation and disengagement of the stud from the stud-holding means.

The stud-holding means is caused to lift and remain in lift position with the stud spaced from the work by a solenoid. The solenoid of the gun comprising the invention is designed for conventional stud welding and intended to remain in lift position only momentarily. This solenoid requires a comparatively large current for lift, while requiring only a fraction of the lift current to maintain the stud-holding means in lift position. In percussion welding, however, the stud may be maintained in lift position for an extended period of time with the result that the higher lift current supplied to the solenoid would be very likely to cause the solenoid to overheat. Accordingly, the control circuit is adapted to supply an initially high lift current to the solenoid and then a considerably smaller current to maintain the solenoid in lift position. The solenoid is primarily designed to act against the bias of a return spring for lifting only a stud in conventional stud welding. In percussion welding, with this stud welding gun, the same spring provides the force for moving the stud into contact with the work. Accordingly, following each welding cycle and prior to initiation of the next cycle, the solenoid is required to lift the stud-holding means. However, immediately following welding of a stud, the stud-holding means is still in engagement with the stud just welded, and the solenoid cannot exert sufficient force to disengage the stud-holding means from the stud. The control circuit, therefore, is so designed that the solenoid does not become energized until such time as the operator pulls the stud-holding means away from the stud so that it and the stud-holding means are no longer in engagement, then lift occurs automatically.

Reference is now made to the drawings, particularly to Fig. 1, wherein there is shown one form of gun structure for which the control circuit of the invention is especially suited. As shown, said structure comprises a main housing 10, preferably formed of an electrically non-conducting material such as plastic, for example, of the thermosetting phenolic type. Housing 10 comprises a generally cylindrical barrel 12 and, in its preferred form, a handgrip or handle 14 and is preferably formed of two or more sections so that it can be easily disassembled to permit ready access to the operating elements contained therein. Slidably mounted in barrel 12, preferably beneath the main longitudinal axis thereof, is a leg member 16. Secured to leg member 16 is a tripod face plate 17 having three extended feet 18 symmetrically arranged around an opening 19 in the face plate, which is preferably aligned with the main longitudinal axis of the gun. Feet 18 and the position of tripod face plate 17 on leg 16 are preferably adjustable so that the gun can be positioned at any desired distance from the workpiece. A face plate 21 is provided on the gun barrel for mounting leg 16 and tripod face plate 17.

Barrel 12 is provided with a main longitudinal bore open at both ends and has an intermediate, inwardly extending section 20 which separates said bore into essentially two chambers. Slidably mounted in the front open end of said barrel are stud-holding means 22 which may comprise a chuck adaptor, a chuck and a spring and which operatively mounts the stud. The stud is fixed in the stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28, which is preferably integrally formed with and extends rearwardly from a screw member 30, whose threaded shank 32 is screwed into a threaded bore provided therefor in stud holder 22. Members 30 and 22 are formed of conducting material, preferably a metal such as steel, and barrel 28 is suitably heat-treated so that the internal surface thereof has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with said stud holder 22 and lifting member 26 is a sleeve 36 biased in plunge direction and provided with a forward cylindrical portion 38 of enlarged diameter, said portion being equipped with a plurality of recesses 40 and serving as a cage to operatively mount a plurality of balls 42 in said recesses. Two balls have been shown in Fig. 1 in order to illustrate that a plurality of such balls are carried by the cage 38 and that these are equally spaced around the periphery thereof to provide a uniform distribution of the lifting forces exerted thereby when in operation. Ball cage 38 has an outer diameter which is sufficiently smaller than the internal diameter of the ball-engaging surface of barrel 28 within which it fits to preclude any appreciable surface contact, and the internal diameter of the rear portion of sleeve 36 is sufficiently larger than the external diameter of the portion of the lifting member 26, which it surrounds, to prevent any appreciable frictional engagement therebetween.

Rigidly mounted on the forward end of lifting member 26 is a ball-engaging member 44 provided with a tapered ball-engaging peripheral surface 46, the diameter of said surface decreasing in the direction of said lifting member. Member 44 may be secured to or integrally formed with lifting member 26 and, as shown, a screw 48 extending through member 44 and threaded into the end of member 26 effects the desired union between the said members.

Balls 42 are adapted to be engaged by tapered surface 46 when the latter is moved in lift direction relative to cage 38, and this engagement forces said balls rapidly outward into engagement with the internal surface of barrel 28. This tends to lock together the ball-engaging members 44 and 28 and the elements secured thereto, namely, lifting member 26 and stud holder 22, and renders mechanism 24 operative.

An internal shoulder 50 is formed in the forward end of sleeve 36 adjacent cage 38 and is adapted to engage a shoulder 52 in the forward end of member 26 to provide a stop for the movement in plunge direction of lifting member 26 relative to sleeve 36. At the rear end of sleeve 36, an outwardly extending flange 54 is provided and is adapted to engage an inwardly extending flange 56 in intermediate section 20 of the housing in its movement in plunge direction, whereby said flange 56 fixes the foremost position of sleeve 36 relative to housing 10.

A mainspring 58 is provided for normally biasing member 30 and stud holder 22 along therewith in a plunge direction. Spring 58 is held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i.e., balls 42 are inoperative to effect frictional engagement between barrel 28 and member 44. Thus, so long as shoulder 52 is held in engagement with shoulder 50, barrel 28, and hence stud holder 22, is free for movement in either direction relative to lifting member 26. A spring 64 located between internal shoulder 56 and an external shoulder 66 provided by the base of ball cage 38 normally biases sleeve 36 in a plunge direction. A further spring 68 which exerts a sufficient biasing force upon lifting member 26 to overcome the weight thereof urges said member in a plunge direction so that normally shoulder 52 engages shoulder 50 and maintains connecting mechanism 24 inoperative.

As a means for applying a lifting force to member 26, there is provided in the gun structure, in the form shown, a solenoid 70. Lifting member 26 is the movable core of said solenoid and includes a portion 72 of enlarged diameter, a tapered portion 74 and a rear portion 76 of diminished diameter. Surrounding movable core 26 is the solenoid coil 78 which is housed in a metallic structure comprising an internal cylindrical sleeve 80, for example of brass, an external sleeve 82, for example of steel, a front plate 84, rear wall 86 and a stationary core 88. Stationary core 88, rear wall 86 and outer sleeve 82 may be integrally formed, and this integral structure is preferably provided with an internal bore that slidably receives core portion 76.

A cap member 90 is fed into the opening at the rear of gun barrel 12, said member 90 being preferably formed of an electrically nonconducting material such as, for example, the same plastic material from which the gun housing is formed. Spring 68, which biases movable core 26 in a plunge direction, is preferably mounted between the end of said reduced portion 76 of the movable core and the inner wall of cap 90. Cap 90 is preferably secured to stationary core 88 and rear wall 86 so that said cap, stationary core 88, wall 86 and sleeve 82 move as a unit. However, plate 84, inner sleeve 80 and solenoid coil 78 are free to move angularly with respect to the remainder of the solenoid housing, but are restrained by outer sleeve 82 so as to move axially along with said outer sleeve. Plate 84 abuts against one end of inner sleeve 80, and the other end of said sleeve abuts against wall 86 so that the axial position of the front surface of plate 84 is precisely fixed in the gun housing in relation to stationary core 88 of the solenoid and the axial position of plate 84 may be controlled by adjusting the position of cap member 90. By mounting plate 84 and solenoid coil 78 so that the latter are not rotated along with sleeve 82, adjustment of cap 90 leaves unaffected the electrical connections which are made to the solenoid coil through plate 84 despite the rotation of sleeve 82.

To precisely control the lift of the stud and prevent over-travel of stud holder 22 relative to lifting member 26, sleeve 36 is so formed and mounted in relation to lifting member 26 and stationary core 88 that, during the lift, the end of sleeve 36 engages plate 84 and is positively stopped thereby before the end of movable core 70 engages stationary core 88. It is to be observed that adjustment of the total lift will be obtained by adjusting the position of the plate 84 by means of cap 90, but that such adjustment does not affect the aforementioned sequence of operations because the axial position of plate 84 is fixed relative to the axial position of stationary core 88. By having sleeve 36 engage and be positively stopped before lifting member 26 engages any stops, the stopping force is transmitted through said sleeve to balls 42 in a direction which tends to augment the wedging action between the plate-engaging surfaces of elements 44 and 28.

Disposed in hand-grip 14 of the housing, in a position to be readily engaged by the finger of the gun operator, is a trigger in the form of a push-button 91 which, when depressed, is adapted to actuate a control switch 92. A pair of electrical cables 93 and 94 preferably extend through the bottom of the hand-grip into the housing to effect the necessary electrical connections. Cable 94 provides the welding current and is connected by a connector element 95 to a conducting rod 96 which, in turn, is affixed to and makes contact with conductor 34. The structure comprising conductor 34, rod 96 and connector 95 is freely movable longitudinally of gun barrel 12 along with stud holder 22, cable 94 being sufficiently flexible and having enough play in the gun handle to permit such free movement. Cable 93 carries four control wires 93A, 93B, 93C and 93D; wires 93A and 93B being connected to switch 92, and wires 93C and 93D extending upward through the gun housing to connect with solenoid coil 78 through plate 84.

The gun of Fig. 1 is shown in lift position with flange 54 engaging plate 84 and mechanism 24 locked in operative position. However, prior to movement into lift position, stud holder 22 is in its foremost position in plunge direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58. Prior to the commencement of a welding cycle by depression of trigger 91, solenoid 78 is energized to move member 26 in a lift direction while sleeve 36 continues to be biased in plunge direction by its spring 64. As a result, when lifting member 26 has moved a predetermined constant short distance in lift direction, balls 42 frictionally engage and are wedged between the surface 46 of member 44 and the internal surface of barrel 28. This locks together lifting member 26 and stud holder 22 and begins the lift of the latter. Lift is terminated when the end of flange 54 of sleeve 36 abuts against plate 84 and renders more positive the locking engagement between stud holder 22 and lifting member 26. The elements are so held as long as solenoid 78 remains energized.

Upon deenergization of the solenoid coil, stud holder 22, sleeve 36 and lifting member 26 are moved in a plunge direction under the influence of their respective springs, and the stud held by said holder is plunged into engagement with the body member.

The stud welding apparatus of the invention includes, in combination with the welding gun described above, a novel power supply and control circuit for supplying welding current to the gun and for controlling the operation of both the gun and the power supply during welding operations. Referring now to Fig. 2 of the drawings, there is illustrated a power supply and control circuit embodying the invention adapted to be powered from an alternating current source such as conventional 115 volt or 230 volt sources. The power supply and control circuit is connected to the alternating current source through a manually operable circuit breaker 94 which may be employed for turning the apparatus on and off and which preferably includes means for opening the circuit breaker when power from the source exceeds a predetermined value.

As previously noted, welding current is supplied to the gun and stud by the discharge of a capacitor, charging current for the capacitor being supplied by a rectifier connected to the alternating current source. In order to provide power for the capacitors in a predetermined voltage range regardless of whether the circuit is connected with a 115 or 230 volt source, and since it is desirable to avoid defining polarity at the power input terminals with respect to the welding ground, there is provided a power transformer 96 which also functions to isolate the alternating current power input circuit from the welding supply circuit and the control circuit. Power transformer 96, in the form shown, includes two primary terminals comprising a 115 volt terminal 96A and a 230 volt terminal 96B. The secondary of transformer 96 is connected to a continuously tapped autotransformer 98. Power transformer 96 supplies a substantially uniform voltage to autotransformer 98 (115 volts, for example) regardless of whether transformer 96 is connected with a 115 volt source or a 230 volt source. Autotransformer 98 is variable and supplies current to the welding supply circuit within a range of voltages, for example from 0 to 140 volts. Transformer 96 also provides current for operating the control circuit. A double-throw switch 102, adaptable to manual control by the operator, is provided for connecting the alternating current power supply to either the 115 volt terminal 96A or the 230 volt terminal 96B of the transformer 96 (depending on the input voltage).

The capacitance power supply circuit includes a plurality of condensers designated 108, 109, 110, 111, 112, and 113, and a continuous shorting switch 114 having an off position shown in Fig. 2. Switch 114 may be pivoted so as to connect one or more of the six condensers in the power supply circuit, thereby providing for a choice of capacitance and welding current. Connected in series with switch 114, condensers 108 through 113 and autotransformer 98, are a limiting resistor 116 and rectifier 100. Transformer 98 provides means for varying the alternating current voltage to rectifier 100, while resistor 116 functions to limit the charging current to the condensers so that the current does not become excessively high.

The power supply and control circuit is housed in a suitable enclosure provided with means for preventing danger to the operator should he remove the enclosure without first opening the circuit breaker 94 and is adapted to open the charging circuit to the condensers and simultaneously connect the condensers through a resistance to the ground for discharging the condensers. This safety means comprises a normally closed safety switch 118 which is adapted to be opened by removal of the enclosure and is connected in series with a control relay 120 across the input to the power transformer. Relay 120 includes a normally open contact point 122 connected between the secondary of transformer 96 and the control circuit and autotransformer 98 so that no current can be supplied to the condensers when relay 120 is deenergized, as when no power is supplied to the 115 volt-230 volt alternating current terminals, circuit breaker 94 is opened, or when switch 118 is opened. Control relay 120 includes a second, normally closed contact point 126 connected in series with a discharge resistor 128 and the condensers to provide a discharge path for the condensers when switch 118 is open. When switch 118 is closed and relay 120 is energized, contact point 126 is opened, permitting the condensers to be charged. The charging and power supply circuit also includes a pilot light 130 connected across the alternating current input for indicating that the circuit breaker is closed, and a voltmeter 132 connected directly across the condensers for indicating the voltage across the condensers.

The control circuit of the invention is intended to control the charging and discharging of the capacitors, as well as the action of the welding gun, and to coordinate the condenser discharge of welding current with the operation of the gun during the welding cycle. The control circuit includes a main contactor coil 134 connected in series with trigger switch 92 for controlling the operation of a normally closed switch 136 in the condenser charging circuit and a normally open switch 138 between the condensers and the ground and grounded workpiece to which a stud is to be welded. Switches 136 and 138 are so associated with coil 134 that energizing the coil causes switch 136 to open and switch 138 to close. The switches thereby allow the condensers either to be charged, or to be discharged through the welding gun which is connected to the side of the condensers opposite switches 136 and 138.

The only control had by the operator during the welding of a stud is by a push button or trigger 91 and control switch 92 located in the welding gun and which may be depressed or closed to commence a completely automatic welding cycle. The control circuit includes three time delay relay coils designated 140, 146 and 150. Time delay coil 140 has a normally closed contact 142 and a normally open contact 144. Contact 142 is connected in series with a full wave bridge rectifier 154 for supplying direct current to the gun solenoid 78. Contact 144 is connected in series with time delay coil 146 and a transformer 156 for controlling the energization of coil 146 and the flow of alternating current to transformer 156. Coil 146 includes a normally closed contact 148 between trigger switch 92 and main contactor coil 134.

Transformer 156 provides current for a direct current relay coil 158 connected in a circuit through the welding gun. A full wave bridge rectifier 162, in series with transformer 156, provides direct current voltage to coil 158. Rectifier 162 performs the additional function of blocking high-energy direct current voltage across the condensers. Since coil 158 is connected in series with the welding arc (through the gun to the ground), transformer 156 performs the additional function of isolating the alternating current power supply from the welding ground, thereby eliminating defining of input terminal polarity with respect to ground.

As previously noted, the current required to maintain solenoid coil 78 in lift position is only a fraction of that required for moving the coil and stud-holding means into lift position. Accordingly, a limiting resistor 164 is provided between the gun solenoid and rectifier 154 for limiting the current through the solenoid coil. Time delay coil 150 includes a normally closed contact 152 in a circuit between the gun solenoid and rectifier 154 for by-passing resistor 164 and connecting the solenoid directly to the rectifier thereby providing the requisite high lift current.

Direct current coil 158 includes a normally open switch 160 connected in a circuit across trigger switch 92 for by-passing the latter.

The operation of the stud welding apparatus is substantially automatic insofar as the operator is concerned. Upon closing of circuit breaker 94, the condensers begin to charge and the solenoid coil and stud-holding means move into lift position. The operator need only insert a stud into the stud-holding means, place the gun in welding position with tripod feet 18 resting on the workpiece, and depress the trigger on the gun. By the time (ten seconds, for example) the operator has loaded a stud into the stud-holding means, the condensers should be fully charged so that, when the operator depresses the trigger closing control switch 92, the stud-lifting assembly (solenoid and stud-holding means) moves the stud toward the work and a welding arc results as the stud tip contacts the work. The stud is forced against the work and metal fusion results between the stud and the workpiece. Any time after completion of the weld, the operator may lift the gun from the welded stud, whereupon the lifting assembly automatically moves into lift position and is ready for insertion of another stud and the performance of another welding operation. The apparatus may be inactivated by opening the circuit breaker switch, whereupon the lifting assembly drops to plunge position and the capacitors begin to discharge (taking, for example, approximately twenty seconds).

In the power supply and control circuit itself, when circuit breaker switch 94 is closed, voltage is applied to power transformer 96, control relay 120 and the pilot light 130, the latter glowing to indicate that the apparatus is in operation. With control relay 120 energized, relay point 122 closes, completing the condenser charging circuit while relay point 126 opens, breaking the condenser discharge circuit through resistor 128. With contact point 122 closed, the primary of autotransformer 98 is supplied with voltage, and direct current begins to flow through resistor 116, rectifier 100, one or more of condensers 108 through 113, and normally closed contactor switch 136. Voltmeter 132 indicates the charging voltage across the condensers. Since contact point 126 is open, no current can flow through resistor 128. Since contactor switch 138 is open and the stud is not yet in contact with the workpiece, no current flows through the welding circuit.

Closing of circuit breaker switch 94 also supplies voltage to the control circuit. Contact point 142 being normally closed, time delay coil 150 is energized and alternating current flows through rectifier 154 which, in turn, supplies direct current to solenoid coil 78 through normally closed contact points 152, energizing the solenoid coil and causing it to lift the lifting assembly. After a predetermined interval (for example, about twenty cycles), sufficient for the lifting assembly to move into lift position, relay coil 150 times out, opening contact point 152 and causing current from rectifier 154 to flow through resistor 164, thereby appreciably reducing the current to the solenoid coil to a lower value, for example, less than ten percent of its original value, required for holding the lifting assembly in lift position. This arrangement prevents the likelihood of over-heating of the solenoid coil from excessive current and is necessitated by the fact that the welding gun and coil are intended primarily for conventional stud welding operation during which the lifting assembly remains in lift position only momentarily and not for extended periods.

The stud-holding means of the gun is then loaded with a stud, the gun is placed in welding position, and the trigger switch is closed by the operator. Since contact point 148 is normally closed, main contactor coil 134 is supplied with current, opening switch 136 in the condenser charging circuit and closing switch 138 so that welding current may flow from the condensers through the gun and stud when the stud contacts the workpiece. Closing of trigger switch 92 also energizes time delay coil 140. After a predetermined delay (approximately fifteen cycles, for example), delay coil 140 times out, causing contact point 142 to open and contact point 144 to close. Opening of contact point 142 interrupts the flow of current to solenoid coil 78 and to time delay coil 150, whereupon contact point 152 closes and the stud-lifting assembly of the gun drops in plunge direction, driving the stud toward the workpiece. When the stud tip contacts the workpiece, an arc results, disintegrating the tip while the stud is forced into the plate by the springs in the gun assembly, resulting in a weld between the base of the stud and the workpiece.

When contact point 144 closes, time delay coil 146 is energized and voltage is supplied to transformer 156. The secondary of transformer 156 supplies voltage to rectifier 162 so that, when contact is made between the stud and the workpiece, direct current from rectifier 162 flows through the arc between the stud and plate and through relay coil 158. This energizes coil 158, causing switch 160 to close, forming a by-pass or interlock across the trigger, keeping contactor coil 134 and time delay coil 140 energized independently of the function of the trigger. The operator may, therefore, release the trigger any time after switch 160 closes, it being estimated that the operator need hold the trigger in depressed position for approximately one-half second, with the time delay period exemplified.

After a predetermined interval (for example, fifteen cycles) following closing of contact point 144, time delay coil 146 times out, causing contact point 148 to open. This deenergizes main contactor coil 134, causing switch 138 to open and switch 136 to close so that the condensers then begin to charge.

The gun solenoid, being designed primarily for conventional stud welding, is not intended to exert sufficient force to pull the stud-holding means away from the welded stud and, accordingly, is caused to remain in plunge position for as long as the stud-holding means is in engagement with the stud and until disengaged therefrom. When the gun is withdrawn from the stud, the circuit providing current for direct current delay coil 158 is interrupted, deenergizing coil 158 and causing switch 160 to open. Time delay coil 140 is thereby deenergized, allowing contact point 144 to open and contact point 142 to close. As contact point 144 opens, time delay coil 146 is deenergized, causing contact point 148 to close. As contact point 142 closes, current is again supplied to rectifier 154 and gun solenoid 78, causing the lifting assembly to lift. Closing of contact point 142 energizes time delay coil 150, which times out after a predetermined interval (approximately twenty cycles), causing contact point 152 to open so that the gun solenoid current is reduced to a safe value not likely to cause over-heating. The gun is now ready for the insertion of another stud and the commencement of another welding cycle.

When the circuit breaker switch is opened, voltage to the control circuit is also interrupted, the gun solenoid is deenergized, dropping the gun lifting assembly to plunge position, and time delay coil 150 is deenergized, causing contact point 152 to close. If instead of circuit breaker switch 94 being opened to shut the welding apparatus off, the power is disconnected from the alternating current input terminals, the procedure for deenergizing and discharging is exactly as described above. If, by accident, the enclosure is removed, safety switch 118 opens, control relay 120 is deenergized, allowing control relay point 122 to open and control relay point 126 to close. When control relay point 122 opens, the condenser charging current is interrupted; and when control relay point 126 closes, the condensers begin to discharge through resistor 128.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a stud welding apparatus comprising a welding gun including means for holding a stud, means including a solenoid for moving said stud-holding means in lift direction and resilient means for moving said stud-holding means in plunge direction, the combination with said gun of control means for operating said gun, said control means including means for supplying current to said solenoid for moving said stud-holding means in lift direction, said current supply means being connected to said solenoid through switch means, relay means for controlling the operation of said switch means, means for supplying current to said relay means, the last-mentioned current supply means being connected to said relay means through said welding gun, stud and workpiece, whereby disengagement of said stud-holding means from said stud following welding of said stud to said workpiece interrupts the flow of current to said relay means, the latter being adapted, when deenergized, to close said switch means, energizing said solenoid and moving said stud-holding means in lift direction.

2. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, said welding current supply means including capacitance means and means for supplying charging current for said capacitance means, said control means including first relay means for connecting said welding gun with said capacitance means and for disconnecting said capacitance means from said means for supplying charging current thereto, second current supply means for supplying current to said solenoid for moving said stud-holding means in lift direction, said second current supply means being connected to said solenoid through switch means, second relay means for controlling the operation of said switch means, third current supply means for supplying current to said second relay means, said third current supply means being connected to said second relay means through said welding gun, stud and workpiece, whereby disengagement of said stud-holding means from said stud following welding of said stud to said workpiece interrupts the flow of current to said second relay means, the latter being adapted, when deenergized, to closed said switch means, energizing said solenoid and moving said stud-holding means in lift direction.

3. In a stud welding apparatus comprising a welding gun including means for holding a stud, means including a solenoid for moving said stud-holding means in lift direction and resilient means for moving said stud-holding means in plunge direction, the combination with said gun of control means for operating said gun, said control means including means for supplying current to said solenoid for moving said stud-holding means in lift direction, means operative, when said stud-holding means is in lift position, for reducing the value of the current supplied to said solenoid, switch means, said current supply means being connected to said solenoid through said switch means, relay means for controlling the operation of said switch means, means for supplying current to said relay means, the last-mentioned current supply means being connected to said relay means through said welding gun, a stud held in said stud-holding means and a workpiece, whereby disengagement of said stud-holding means from said stud following welding of said stud to said workpiece interrupts the flow of current to said relay means, the latter being adapted, when deenergized, to close said relay switch, energizing said solenoid and moving said stud-holding means in lift direction.

4. In a stud welding apparatus comprising a welding gun including means for holding a stud, means including a solenoid for moving said stud-holding means in lift direction, and resilient means for moving said stud-holding means in plunge direction, the combination with said gun of welding current supply means and control means for operating said gun, both of the last-mentioned means being adapted to be connected to a source of alternating current, said control means including means for supplying current to said solenoid, normally closed switch means for connecting said current supply means with said alternating current source, first time delay means operative, when energized, to open said switch means and allow said stud-holding means to move in plunge direction for moving a stud held thereby into contact with the workpiece, relay means, means for supplying current to said relay means, said relay means being connected to the last-mentioned current supply means through said gun and said workpiece, said relay means being operative, when deenergized by disengagement of said stud-holding means from said stud following welding of the latter to said workpiece, to deenergize said time delay means, permitting said switch means to close, energizing said solenoid and causing said stud-holding means to move in lift direction.

5. In a stud welding apparatus comprising a welding gun including means for holding a stud, means including a solenoid for moving said stud-holding means in lift direction, and resilient means for moving said stud-holding means in plunge direction, the combination with said gun of welding current supply means and control means for operating said gun, both of the last-mentioned means being adapted to be connected to a source of alternating current, said control means including a rectifier connected to said solenoid for supplying direct current thereto, normally closed switch means for connecting said rectifier with said alternating current source, time delay means, a manually operable trigger switch for energizing said time delay means, the latter being operative, when energized, to open said switch means and allow said stud-holding means to move in plunge direction for moving a stud held thereby into contact with the workpiece, relay means, means for supplying current to said relay means, means connecting said relay means to the last-mentioned current supply means through said gun and said workpiece, said relay means being operative, when deenergized by disengagement of said stud-holding means from said stud following welding of the latter to said workpiece, to deenergize said time delay means, permitting said switch means to close, energizing said solenoid and causing said stud-holding means to move in lift direction.

6. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier connected to said solenoid for supplying direct current thereto, first relay means for connecting said welding gun with said capacitance means and for disconnecting said capacitance means from said means for supplying charging current thereto, normally closed switch means for connecting said rectifier with said alternating current source, time delay means operative, when energized, to open said switch means and allow said stud-holding means to move in plunge direction for moving a stud held thereby into contact with the workpiece, second relay means, means for supplying current to said second relay means, said second relay means being connected to the last-mentioned current supply means through said gun and said workpiece, said second relay means being operative, when deenergized by disengagement of said stud-holding means from said stud following welding of the latter to said workpiece, to deenergize said time delay means, permitting said switch means to close, energizing said solenoid and causing said stud-holding means to move in lift direction.

7. The stud welding apparatus of claim 6 wherein said means for supplying current to said second relay means comprises a transformer and rectifier, said transformer having its primary connected to said alternating current source and its secondary connected to the last-mentioned rectifier.

8. The stud welding apparatus of claim 6 wherein said means for supplying current to said second relay means comprises a transformer connected to said alternating current source through a normally open second switch, the operation of said second switch being controlled by said time delay means, whereby said second switch is closed when said first switch is opened.

9. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier connected to said solenoid for supplying direct current thereto, first relay means for connecting said welding gun with said capacitance means and for disconnecting said capacitance means from said means for supplying charging current thereto, normally closed switch means for connecting said rectifier with said alternating current source, time delay means, a manually operable control switch for energizing said first relay means and said time delay means, the latter being operative, when energized, to open said switch means and allow said stud-holding means to move in plunge direction for moving a stud held thereby into contact with the workpiece, second relay means, means for supplying current to said second relay means, means connecting said second relay means to the last-mentioned current supply means through said gun and said workpiece, said second relay means being operative, when deenergized by disengagement of said stud-holding means from said stud following welding of the latter to said workpiece, to deenergize said time delay means, permitting said switch means to close, energizing said solenoid and causing said stud-holding means to move in lift direction.

10. The stud welding apparatus of claim 9 comprising a second normally open switch means for by-passing said control switch and, when closed, connecting said time delay means and said first relay means with said alternating current source, the operation of said second switch being controlled by said second relay means, whereby said time delay means remains energized for at least as long as said second relay means remains energized by current flowing through said stud and said gun.

11. In a stud welding apparatus comprising a welding gun including means for holding a stud, means including a solenoid for moving said stud-holding means in lift direction, and resilient means for moving said stud-holding means in plunge direction, the combination with said gun of welding current supply means and control means for operating said gun, both of the last-mentioned means being adapted to be connected to a source of alternating current, said control means including current supply means, resistance means connected in series with said current supply means and said solenoid, normally closed first switch means in a circuit connecting said current supply means directly with said solenoid and by-passing said resistance, normally closed second switch means for connecting said current supply means to said alternating current source, time delay means adapted to be connected to said alternating current source by closing of said second switch means and being operative following a predetermined interval to open said first switch means, causing current from said current supply means to flow through said resistance to said solenoid thereby reducing the value of said current supplied to said solenoid for maintaining said solenoid in lift position.

12. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier, resistance means connected in series with said rectifier and said solenoid, normally closed first switch means in a circuit connecting said rectifier directly with said solenoid and by-passing said resistance, first relay means for connecting said welding gun with said capacitance means and for disconnecting said capacitance means from said means for supplying charging current thereto, normally closed second switch means for connecting said rectifier to said alternating current source, time delay means operative, when energized, for opening said second switch means, allowing said stud-holding means to move in plunge direction and moving a stud held thereby into contact with the workpiece, second time delay means adapted to be connected to said alternating current source by closing of said second switch and being operative, following a predetermined interval, to open said first switch means, causing current from said rectifier means to flow through said resistance to said solenoid, thereby reducing the value of said current supplied to said solenoid for maintaining said solenoid in lift position.

13. In a stud welding apparatus comprising a welding gun including means for holding a stud, means including a solenoid for moving said stud-holding means in lift direction, and resilient means for moving said stud-holding means in plunge direction, the combination with said gun of welding current supply means and control means for operating said gun, both of the last-mentioned means being adapted to be connected to a source of alternating current, said control means including a rectifier, resistance means connected in series with said rectifier and said solenoid, normally closed first switch means in a circuit connecting said rectifier directly with said solenoid and by-passing said resistance, normally closed second switch means for connecting said rectifier to said alternating current source, time delay means, a manually operable trigger switch for energizing said time delay means, the latter being operative, when energized, for opening said second switch means and allowing said stud-holding means to move in plunge direction so as to move a stud held thereby into contact with the workpiece, second time delay means adapted to be connected to said alternating current source by closing of said second switch, said second time delay means being operative following a predetermined interval to open said first switch means, causing current from said rectifier means to flow through said resistance to said solenoid thereby reducing the value of said current required for maintaining said solenoid in lift direction.

14. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier, resistance means connected in series with said rectifier and said solenoid, normally closed first switch means in a circuit connecting said rectifier directly with said solenoid and by-passing said resistance, first relay means for connecting said welding gun with said capacitance means and for disconnecting said capacitance means from said means for supplying charging current thereto, normally closed second switch means for connecting said rectifier to said alternating current source, time delay means, a manually operable control switch for energizing said first relay means and said time delay means, the latter being operative, when energized, for opening said second switch means, allowing said stud-holding means to move in plunge direction and moving a stud held thereby into contact with the workpiece, second time delay means adapted to be connected to said alternating current source by closing of said second switch, said second time delay means being operative, following a predetermined interval, to open said first switch means, causing current from said rectifier means to flow through said resistance to said solenoid, thereby reducing the value of said current required for maintaining said solenoid in lift position.

15. In a stud welding apparatus comprising a welding gun including means for holding a stud, means including a solenoid for moving said stud-holding means in lift direction, and resilient means for moving said stud-holding means in plunge direction, the combination with said gun of welding current supply means and control means for operating said gun, both of the last-mentioned means being adapted to be connected to a source of alternating current, said control means including first current supply means, resistance means connected in series with said current supply means and said solenoid, normally closed first switch means in a circuit connecting said current supply means directly with said solenoid and by-passing said resistance, normally closed second switch means for connecting said current supply means to said alternating current source, first time delay means operative, when energized, for opening said second switch means, allowing said stud-holding means to move in plunge direction and moving a stud held thereby into contact with the workpiece, relay means, second current supply means for supplying contact to said relay means, said relay means being connected to said second current supply means through said gun and said workpiece, said relay means being operative, when deenergized by disengagement of said stud-holding means from said stud following welding of the latter to said workpiece, to deenergize said first time delay means, permitting said second switch to close, energizing said solenoid and causing said stud-holding means to move in lift direction, said second time delay means being adapted to be connected to said alternating current source by closing of said second switch and being operative, following a predetermined interval, to open said first switch means and cause current from said first current supply means to flow through said resistance to said solenoid, thereby reducing the value of said current supplied to said solenoid for maintaining said solenoid in lift position.

16. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier, resistance means connected in series with said rectifier and said solenoid, normally closed first switch means in a circuit connecting said rectifier directly with said solenoid and by-passing said resistance, first relay means for connecting said welding gun with said capacitance means and for disconnecting said capacitance means from said means for supplying charging current thereto, normally closed second switch means for connecting said rectifier to said alternating current source, first time delay means operative, when energized, for opening said second switch means, allowing said stud-holding means to move in plunge direction and moving a stud held thereby into contact with the workpiece, second relay means, means for supplying current to said second relay means, said second relay means being connected to the last-mentioned current supply means through said gun and said workpiece, said second relay means being operative, when deenergized by disengagement of said stud-holding means from said stud following welding of the latter to said workpiece, to deenergize said first time delay means, permitting said second switch means to close, energizing said solenoid and causing said stud-holding means to move in lift direction, and second time delay means adapted to be connected to said alternating current source by closing of said second switch and being operative, following a predetermined interval, to open said first switch means and cause current from said rectifier means to flow through said resistance to said solenoid, thereby reducing the value of said current required for maintaining said solenoid in lift position.

17. The stud welding apparatus of claim 16 wherein said means for supplying current to said second relay means comprises a transformer and a rectifier, said transformer having its primary connected to said alternating current source and its secondary connected to said rectifier.

18. The stud welding apparatus of claim 16 wherein said means for supplying current to said second relay means comprises a transformer connected to said alternating current source through a normally open third switch, the operation of said third switch being controlled by said first time delay means whereby said third switch is closed when said first switch is opened.

19. In a stud welding apparatus comprising a welding gun including means for holding a stud, means including a solenoid for moving said stud-holding means in lift direction and resilient means for moving said stud-holding means in plunge direction, the combination with said gun of welding current supply means and control means for operating said gun, both of the last-mentioned means being adapted to be connected to a source of alternating current, said welding current supply means including capacitance means and means for supplying charging current for said capacitance means, said control means including a rectifier, resistance means connected in series with said rectifier and said solenoid, normally closed first switch means in a circuit connecting said rectifier directly with said solenoid and by-passing said resistance, first relay means for connecting said welding gun with said capacitance means and for disconnecting said capacitance means from said means for supplying charging current thereto, normally closed second switch means for connecting said rectifier to said alternating current source, first time delay means, a manually operable control switch for energizing said first relay means and said time delay means, the latter being operative, when energized, for opening said second means and allowing said stud-holding means to move in plunge direction, moving a stud held thereby into contact with the workpiece, second relay means, means for supplying current to said second relay means, means connecting said second relay means to the last-mentioned current supply means through said gun and said workpiece, said second relay means being operative, when deenergized by disengagement of said stud-holding means from said stud following welding of the latter to said workpiece, to deenergize said first time delay means, permitting said second switch means to close, energizing said solenoid and causing said stud-holding means to move in lift direction, and second time delay means adapted to be connected to said alternating current source by closing of said second switch, said second time delay means being operative, following a predetermined interval, to open said first switch means, causing current from said rectifier means to flow through said resistance to said solenoid and thereby reduce the value of said current required for maintaining said solenoid in lift position.

20. The stud welding apparatus of claim 19 comprising a third normally open switch means for by-passing said control switch, when closed, connecting said first time delay means and said first relay means with said alternating current source, the operation of said third switch being controlled by said second relay means whereby said first time delay means remains energized for at least as long as said second relay means remains energized by current flowing through said gun and said stud.

21. In a stud welding apparatus comprising a welding gun including means for holding a stud, means including a solenoid for moving said stud-holding means in lift direction and resilient means for moving said stud-holding means in plunge direction, the combination with said gun of control means for operating said gun, said control means including means for supplying current to said solenoid for moving said stud-holding means in lift direction, and means for supplying current at a substantially lower value to said solenoid for maintaining said stud-holding means in lift position, said means for supplying current at a substantially lower value to said solenoid comprising a resistor and time delay means for connecting the first-mentioned current supply means to said solenoid through said resistor.

22. In a stud welding apparatus comprising a welding gun including means for holding a stud, means including a solenoid coil for moving said stud-holding means in lift direction and resilient means for moving said stud-holding means in plunge direction, the combination with said gun of control means for operating said gun, said control means including means connected to the ends of said solenoid coil for supplying current to said coil for moving said stud-holding means in lift direction, means for supplying current at a substantially lower value to said solenoid coil for maintaining said stud-holding means in lift position, and time delay means for connecting said means for supplying current at a lower value to said ends of said solenoid coil.

23. In a stud welding apparatus comprising a welding gun including means for holding a stud, means including a solenoid for moving said stud-holding means in lift direction away from a workpiece and resilient means for moving said stud-holding means in plunge direction toward said workpiece, the combination with said gun of control means for operating said gun, said control means including first current supply means connected across said solenoid for supplying current to said solenoid sufficient to move said stud-holding means in lift direction to a lift position, second current supply means connected across said solenoid for supplying current at a substantially lower value to said solenoid sufficient to maintain said stud-holding means in lift position, and means for simultaneously rendering said first current supply means inoperative and said second current supply means operative to supply current to said solenoid after said stud-holding means has been moved into lift position in response to the flow of current from said first current supply means through said solenoid.

References Cited in the file of this patent

UNITED STATES PATENTS

| | | |
|---|---|---|
| 2,342,144 | Hughes | Feb. 22, 1944 |
| 2,610,278 | Graham | Sept. 9, 1952 |
| 2,779,859 | Shoup et al. | Jan. 29, 1957 |
| 2,814,716 | Shoup et al. | Nov. 26, 1957 |